United States Patent [19]

Hahnke et al.

[11] 4,062,877

[45] Dec. 13, 1977

[54] PROCESS FOR THE PREPARATION OF VIOLET DYESTUFFS OF THE TRIPHENYLMETHANE SERIES

[75] Inventors: Manfred Hahnke, Kelkheim, Taunus; Theodor Papenfuhs, Frankfurt am Main, both of Germany

[73] Assignee: Hoechst Aktiengesellschaft, Frankfurt am Main, Germany

[21] Appl. No.: 730,207

[22] Filed: Oct. 6, 1976

[30] Foreign Application Priority Data

Oct. 11, 1975 Germany .............................. 2545649

[51] Int. Cl.$^2$ ............................................. C09B 11/10
[52] U.S. Cl. .................................................. 260/391
[58] Field of Search ........................................ 260/391

[56] References Cited

U.S. PATENT DOCUMENTS

| | | |
|---|---|---|
| 3,184,483 | 5/1965 | Quint et al. ...................... 260/391 X |
| 3,652,602 | 3/1972 | Schafer et al. ........................ 260/391 |
| 3,689,495 | 9/1972 | Lohmann ............................. 260/391 |

*Primary Examiner*—Paul F. Shaver
*Attorney, Agent, or Firm*—Connolly and Hutz

[57] ABSTRACT

A novel process had been found for preparing novel violet dyestuffs of the triphenylmethane series which is characterized by that an aluminum chloride or borotrifluoride or iron-III-chloride-complex compound of a 4,4′,4″-trihalogenotriphenylmethylhalide is reacted with phenyl- or naphthylamine which are substituted in the m- or p-position in a molar ratio of 1 to 1.5 at 110° to 135° C and in an inert organic solvent, and the monophenyl or -naphthylamino- substituted halide formed is reacted with 5 – 20 mols of an ortho-substituted phenyl- or naphthylamine at 150° to 190° C. The dyestuffs so prepared are well suitable for printing paper and plastics and dyeing polyacrylonitrile fibers.

5 Claims, No Drawings

PROCESS FOR THE PREPARATION OF VIOLET DYESTUFFS OF THE TRIPHENYLMETHANE SERIES

It is known that by condensation of complexes of 4,4′,4″-trihalogene-triphenylmethyl halides with Lewis acids, such as AlCl₃, FeCl₃, BF₃, with primary aromatic amines which are substituted in m- or p-position to the amino group, blue dyestuffs of the triphenylrosaniline series may be prepared with a high yield, which have a high purity, color intensity and tinctorial strength (cf. German Patent Specification No. 1,098,652).

Furthermore it is known to prepare reddish blue dyestuffs of the triphenylmethane series by reacting one mol of a complex compound of 4,4′,4″-trichloro-triphenylmethyl chloride and AlCl₃ or FeCl₃ with one mol of a phenyl or naphthyl amine substituted in m- or p-position, and subsequently with at least 5 mols of aniline (cf. German Patent Specification No. 1 644 619). But violet dyestuffs may not be obtained in this manner.

It has now been found that violet dyestuffs of the triphenylmethane series may be prepared by reacting one mol of an aluminum or iron complex compound of a 4,4′,4″-trihalogenotriphenylmethyl halide, wherein the halogen atoms are preferably chlorine atoms, with about one mol of a phenyl or naphthyl amine substituted in m- or p-position by halogen, as for example chlorine or bromine, alkyl of 1 to 4 carbon atoms, alkoxy of 1 to 4 carbon atoms, phenyl, naphthyl, nitro, cyano, sulfonamide, sulfonic acid alkyl ester or a carboxylic acid alkyl ester group (each alkyl moiety having 1 to 4 carbon atoms), at a temperature between about 110° and about 135° C, preferably between about 125° and about 130° C, in the presence of an organic solvent which is inert at the reaction conditions, and reacting the resulting 4,4′-dihalogeno-4″-(m- or p-substituted phenylamino- or naphthylamino)-triphenylmethyl-halide complex compound with at least 5 mols of a phenyl or naphthyl amine substituted in ortho-position to the amino group for example by halogen, such as chlorine or bromine, or alkyl of 1 to 4 carbon atoms, which amine may be further substituted by halogen, such as fluorine, chlorine or bromine, by alkyl or alkoxy each having 1 to 4 carbon atoms, at a temperature between about 150° and about 190° C, preferably between about 170° and about 180° C.

The dyestuffs thus obtained may subsequently be sulfonated.

The reaction with the ortho-substituted amino compound may take place without intermediate isolation of the dihalogenotriphenylmethyl halide complex.

Organic solvents which are inert under the conditions of the process of the invention and which are suitable for it are, for example, chlorobenzene, dichlorobenzene, trichlorobenzene, nitrobenzene, nitromethane or tetrachloroethane or mixtures of these solvents. It is advantageous to use the chlorobenzene as inert solvent, since this compound is suitable to maintain the exothermic reaction of both steps, especially of the first step, in a favorable temperature range.

In the first reaction step expediently one mol of the aluminum or iron complex compound is reacted with one mol of the phenyl or naphthyl amine substituted in m- or p-position. It is also possible to react the phenyl or naphthyl amine in a slightly to moderate molar excess, for example in the molar ratio of 1:1.1 to 1:1.5.

In the further reaction the phenyl or naphthyl amine substituted in o-position to the amino group may also be used in a larger excess (up to 20 mols), and this compound may also serve as solvent after distilling the inert solvent.

The process of the invention is preferably carried out by reacting the 4,4′-dihalogeno-4″-(m- or p-substituted phenylamino- or naphthylamino)-triphenylmethylhalide obtained in the first step without intermediate isolation with the phenyl or naphthyl amine substituted in o-position to the amino group by halogen such as chlorine or bromine, or alkyl of 1 to 4 carbon atoms and unsubstituted or substituted in the residual positions.

In the first reaction step the exchange of one of the halogen atoms in the 4-positions of the 4,4′,4″-trihalogenotriphenylmethylhalide takes place with an excellent yield by a phenyl or naphthylamine radical substituted in m- or p-position as described above, while forming the compound of the formula I

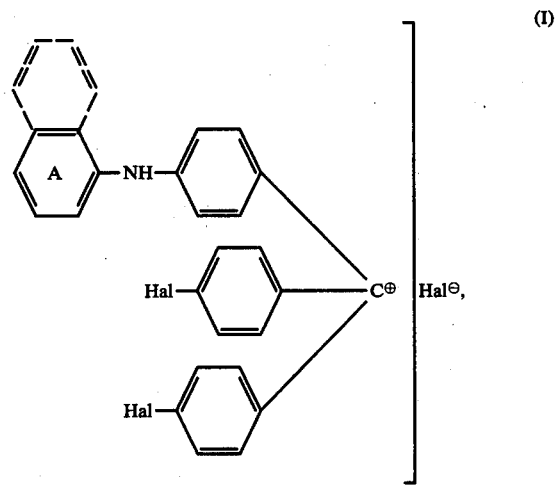

or of the corresponding complex with AlCl₃, FeCl₃ or BF₃ wherein the benzene nucleus A is substituted accordingly in m- or p-position.

In this exchange reaction the addition of an acid-binding agent is not necessary; the hydrogen chloride set free may be removed during the reaction.

In the reaction of the complex compound of the above formula (I) with the above-mentioned o-substituted phenyl- or naphthylamine in excess, (second reaction step), violet dyestuffs are obtained which as to their shade and their chemical properties correspond to the known blue basic dyestuffs obtained from pararosaniline and aniline (cf. H. F. Fierz-David, "Kunstliche organische Farbstoffe" (1926), page 262 et. seq.) which dyestuffs, as is known, are mixtures of mono-, di- and triphenylated pararosanilines. In the known process for preparing these blue basic dyestuffs the degree of phenylation and, thus, the shade depend on the melting period by that with an increasing degree of phenylation the red shade of the pararosaniline is displaced via violettish and reddish blue to greenish blue.

In contradistinction thereto, the present invention is based on a completely different reaction mechanism as regards the formation of the violet dyestuffs from the compounds of the mentioned formula (I) formes in the first step: certainly, first the two remaining halogen atoms in p-position of the compound of the formula (I) are exchanged in the further melting process by the o-substituted naphthyl- or phenylamino radicals, but simultaneously a further reaction takes place surprisingly in the form of a successive partial dephenylation while forming diphenylamino compounds, so that finally a mixture of mono-, di- and triphenylated paratosanilines is obtained.

The melt obtained according to the process can be worked up in known manner in different ways and depends on the provided purpose of the corresponding dyestuff.

The simplest way to isolate the dyestuffs is stirring the melt with diluted mineral acid, in which process the dyestuffs are precipitated in the form of the salts of their mineral acids which may be easily separated from the amine in excess and the present metal salts which are dissolved. If the precipitation is carried out with concentrated mineral acid, for example with a 30 to 60% sulfuric acid, tinctorially more intense dyestuffs are obtained since at the same time the diphenyl amines which has been split off during the reaction, are removed from the dyestuffs by dissolution. — The dyestuffs prepared from the aluminum chloride complex compound may also be isolated by stirring the melt with an alkali, such as an aqueous sodium or potassium hydroxide solution. The carbinol bases resulting from the dyestuff salts are dissolved in the used and present o-substituted phenyl- or naphthyl amine in excess whereas the aluminum salts pass into the aqueous phase. The organic solution is separated from the aqueous aluminate layer, and the o-substituted phenyl or naphthyl amine used as reactant in excess is distilled off in vacuo, in the course of which the carbinol base of the dyestuff passes into the anhydro imine base.

By distillation in high vacuo for example in a thin layer evaporator in which also the diphenyl amines ae distilled off to a large extent, more intense dyestuff bases are also obtained.

Furthermore, very intense products are obtained if the dyestuff which has been isolated by stirring the melt onto diluted mineral acid, is stirred with an organic solvent such as for example chlorobenzene, thus extracting the diphenyl amine compounds (cf. German Patent Specification No. 1,919,724).

The complex compound serving as starting compounds may be prepared in known manner, for example according to German Patent Specifications Nos. 1,036,242 or 1,046,599.

The novel dyestuffs prepared according to the invention may be used for example for printing paper; and plastics; furthermore they are very suitable for dyeing polyacrylonitrile fibres in the spinning mass and from an aqueous dyebath with a very high tinctorial strength and with very high fastnesses to wetting, light and rubbing. By sulfonation by means of a 90 to 95% sulfuric acid, by which process about 1 to 2 sulfo groups per molecule are introduced, very intense pigments suitable for printing paper and plastics, are obtained; the sulfonation with about 100% sulfuric acid, chlorosulfonic acid or oleum by which 3 to 5 sulfo groups per molecule are introduced yields dyestuffs which are very well soluble in water and are suitable for the preparation of aqueous, color-intense writing inks and for the dyeing of wool and synthetic polyamide.

The following Examples illustrate the invention.

EXAMPLE 1

A solution of 200 g of p-chlorobenzotrichloride in 200 g of chlorobenzene is added dropwise to a mixture of 450 g of chlorobenzene and 127.3 g of aluminum chloride during 3 to 4 hours while stirring at 25° C, and the 4,4'-dichlorobenzophenonedichloride is formed. The mixture is heated for 6 hours at 55° - 60° C. After cooling to 0° C the chlorobenzene in excess is suction-filtered on a glass frit from the aluminum complex salt of the 4,4',4"-trichlorotriphenylmethyl chloride which had been crystallized in orange red neddles which are then washed with chlorobenzene.

The content of the flask which contains the 4,4',4"-trichlorotriphenylmethyl tetrachloroaluminate, is mixed with 100 g of m-toluidine and heated for 3 hours at 125° - 130° C, whereby the dark red, 4,4'-dichloro-4"-(m-methylphenylamino)-triphenylmethyl chloride is formed with a strong development of hydrogen chloride. After addition of 600 g of o-toluidine to the hot melt the temperature is increased to 170° - 175° C and the mixture is stirred until a sample in ethanol shows the desired shade, which is the case after about 4 to 6 hours. By the end of the reaction the remaining chlorobenzene is distilled off by establishing a reduced pressure. Then the bronzing dark violet melt is introduced, while stirring, into 3 liters of a 10% hydrochloric acid. The dyestuff precipitated in the form of the chloride is suction-filtered, washed until neutral and dried under reduced pressure. The dyestuff precipitated in the form of the chloride is suction-filtered, washed until neutral and dried under reduced pressure. A bronzing violet powder is obtained which is dissolved in ethanol with a pure violet shade. 400 g of dyestuff are obtained.

If the ready melt is introduced while stirring into 50% of sulfuric acid and the mixture is maintained for 2 to 3 hours at 40° C there are obtained after suction-filtering, washing until neutral and drying the sulfates of the dyestuffs which have a higher content of the pure dyestuff product than the chloride product, since still present diphenyl amines had been dissolved.

EXAMPLE 2

The aluminum complex salt of the 4,4',4"-trichloro-triphenylmethyl chloride prepared from 62.5 g of p-chlorobenzotrichloride, 200 g of chlorobenzene and 40 g of aluminum chloride, is reacted with 50 g of m-toluidine by heating for 3 hours at 130° C, to yield the 4,4'-dichloro-4"-(m-methylphenylamino)-triphenylmethyl chloride. The hot melt is then mixed with 115 g of 2,4-dimethylaniline, and the temperature is increased to 170° - 175° C. In the course of 3 to 4 hours the shade of the melt turns from green to dark violet with a strong bronze gloss. If a sample in ethanol shows the desired violet shade the melt is introduced while stirring into such an amount of an aqueous 20% sodium hydroxide solution until the dyestuff is converted at 90° - 100° C into the brown carbinol from dissolved in 2,4-dimethylaniline, and the aluminium chloride has passed to dissolution as aluminate. Boiling is continued for a short time and the aqueous solution is separated. From the brown carbinol solution the 2,4-dimethylaniline is distilled off in vacuo at 140° - 150° C, whereby the carbinol base obtained passes into the anhydro base form. 120 g of a dyestuff base are obtained.

A purer anhydro base is obtained by distillation at 160° - 170° C/1mm mercury in the thin layer evaporator, since still present diphenylamino bases are also distilled off. 100 g of a dyestuff base are obtained. The brown dyestuff base obtained which is easy to pulverize, is dissolved in glacial acetic acid with a clear violet shade.

EXAMPLE 3

120 g of 4,4',4''-trichlorotriphenylmethyl-tetrachloroaluminate, suspended in 100 cc. of chlorobenzene, are stirred with 39 g of m-phenetidine for 2 hours at 130° C. 180 g of o-chloroaniline are added to the dark red melt, and the mixture is stirred at 175° C until the shade desired is reached; finally chlorobenzene is distilled off under a slightly reduced pressure. The mixture is poured into 500 cc of a 20% sodium hydroxide solution. After boiling for half an hour the organic layer is separated and the o-chloro-aniline is distilled off under reduced pressure.

After cooling a brittle brown product easy to pulverize is obtained which dissolves in glacial acetic acid with a pure violet color. 140 g of a dyestuff base are obtained.

EXAMPLE 4

120 g fo 4,4',4''-trichlorotriphenylmethyl-tetrachloroaluminate, 100 g of chlorobenzene and 33 g of m-chloroaniline are heated for 3 hours at 130° C, after addition of 180 g of o-ethylaniline the mixture is further stirred for 4 to 5 hours at 165° – 170° C. Finally the chlorobenzene is distilled off under reduced pressure. The deep violet strongly bronzing melt is poured into 500 cc of an aqueous 20% sodium hydroxide solution, the aqueous layer is separated and the o-ethyl-aniline is separated from the organic phase. 148 g of a dyestuff base are obtained which are dissolved with a pure violet shade in glacial acetic acid.

EXAMPLE 5

To a suspension of 49 g of anhydrous iron-(III)-chloride in 200 g of chlorobenzene 62.5 g of p-chlorobenzotrichloride are added dropwise in the course of 3 hours at 20° – 25° C. Stirring is continued for 1 hour, the mixture is heated to 55° – 60° C and this temperature is maintained for 5 hours. Already after 1½ hours the iron complex compound crystallizes from the red brown solution in orange red needles having a brassy gloss. After cooling to −5° to 10° C, the chlorobenzene in excess is suction-filtered with a frit and the crystal cake is washed with chlorobenzene.

Then 27.5 g of m-toludine are added, and the mixture is stirred for 2 hours at 130° C. Then 150 g of o-toluidine are poured to this mixture which is stirred for 4 – 5 at 170° – 175° C. Then the melt is poured into 1.5 liters of a 50% sulfuric acid and the mixture is stirred for 2 to 3 hours at 40° C until the dyestuff precipitated has become finegrained. Then the mixture is suction-filtered, washed neutral and dried at 40° C. A dark violet bronzing powder is obtained which is dissolved in ethanol with a pure violet shade. 140 g are obtained.

EXAMPLE 6

152 g of 4,4',4''-tribromo-triphenylmethyl-tetrachloroaluminate, 100 g of chlorobenzene and 36 g of m-nitraniline are heated for 2 hours at 130° C and then heated to 180° C after addition of 250 g of α-naphthylamine, maintained at 180° C for 5 hours and then poured into 3 liters of a 10% hydrochloric acid; stirring is continued for 1 hour at 40° C. The crude product precipitated is suction-filtered, washed with water and dried at 40° C. The product obtained is stirred for one hour in 1 liter of chlorobenzene at 50° – 60° C, then suction-filtered, washed with chlorobenzene and dried at 60° C. 105 g of a dyestuff which dissolves in ethanol with a violet shade and has a high tinctorial strength, are obtained.

EXAMPLE 7

120 g of 4,4',4''-trichlorotriphenylmethyl-tetrachloroaluminate, 100 g of chlorobenzene and 30.4 g of 4-amino-benzonitrile are heated for 2 hours at 130° C; after addition of 200 g of 2-methyl-4-chloro-aniline, the mixture is stirred for 5 hours at 180° C. Finally, the chlorobenzene is distilled off under a slightly reduced pressure. The melt is poured into 500 cc. of an aqueous 20% sodium hydroxide solution. The organic layer is separated and the 2-methyl-4-chloro-aniline is distilled off under reduced pressure. 155 g of the dyestuff base are obtained which are dissolved in glacial acetic acid with a pure violet shade.

EXAMPLE 8

120 g of 4,4',4''-trichlorotriphenylmethyl-tetrachloroaluminate, 100 g of chlorobezene and 36,4 g of aniline-3-sulfonic acid amide are heated for 2 hours at 130° C and after addition of 160 g of o-toluidine stirred for 5 hours at 170° – 175° C; finally the chlorobenzene is distilled off under reduced pressure. The deep violet strongly bronzing melt is poured into 500 cc of an aqueous 20% sodium hydroxide solution. The organic layer is separated and the o-toluidine is distilled off under reduced pressure. The dyestuff base which is dissolved in a glacial acetic acid with a pure violet shade, is obtained in an amount of 145 g.

EXAMPLE 9

120 g of 4,4',4''-trichlorotriphenylmethyl-tetrachloroaluminate, 100 g of chlorobenzene and 29.6 g of p-fluoro-aniline are heated for 2 hours at 130° C and after addition of 200 g of o-toluidine heated for 5 hours at 175° – 180° C, while stirring. After cooling the chlorobenzene is then distilled off under reduced pressure. The strongly bronzing melt is poured into 2 liters of a 20% sulfuric acid, stirred for 1 hour at 40° C, washed neutral and dried in vacuo. 125 g of dyestuff are obtained in the form of the sulfate, which is dissolved in ethanol with a pure violet shade.

EXAMPLE 10

50 g of the dyestuff prepared according to Example 1, are introduced at 20° – 25° C within 1 to 2 hours into 250 g of a 92% sulfuric acid, while stirring well. This mixture is heated to 40° – 45° C and stirred until a sample of 3 drops is soluble in 20 ml of a boiling 4% aqueous ammonia. It is subsequently poured, while stirring, onto 250 g of ice, stirred for 30 minutes at 50° – 60° C, suction-filtered and washed with water. The filter cake is dissolved in 500 ml of water, the mixture is heated to 80° – 85° C, mixed with 27 g of an aqueous 33% sodium hydroxide solution and further heated to the boil. After about 10 minutes a clear reddish solution is obtained which is rapidly mixed with 120 g of a 12% sulfuric acid. The mixture is stirred for 5 minutes at 95° – 100° C, chilled with cold water to 80 – 85° C, suction-filtered and washed with water. After drying at 40° C, 55 g of the corresponding monosulfonated dyestuff are obtained which is excellently suitable for the preparation of color-intense violet printing pastes for printing paper and plastics.

EXAMPLE 11

90 g of a 95.5% sulfuric acid are mixed within 1 to 2 hours at 25° – 30° C with 18 g of the dyestuff prepared according to Example 1. Stirring is continued for 1 hour, the mixture is heated to 60° – 65° C and stirring is continued until the following test is positive: A sample fo 3 drops are shaken with 20 ml of cold water, and the solid product is subsequently suction-filtered; if washed on the filter with water, it bleeds with a distinctively violet shade. The reaction mixture is then poured onto 250 ml of water, stirring is continued for 20 minutes, the mixture is suction-filtered and washed with water, until the washing water has a pH-value of about 3 to 4. The filter cake is dissolved in 50 ml of water and heated to 90° C; then such an amount of an aqueous 33% sodium hydroxide solution is added until a clear solution is formed. By evaporating this solution until dry at 80° – 90° C, 25 g of the corresponding dyestuff sulfonated with 2 to 3 sulfo groups per molecule are obtained in the form of the sodium salt. The dyestuff provides very intense violet dyeings on paper when applied according to known processes of paper printing.

EXAMPLE 12

To 585 g of a 20% oleum 180 g of the dyestuff prepared according to Example 1 are added within 1 to 2 hours at 25° – 30° C. The whole is heated to 80° – 85° C and stirred for 5 hours at this temperature. The reaction mixture is then poured, while stirring vigorously, into 2200 ml of water and then adjusted at 90° – 100° C within 1 hour to a pH value of 7 with a suspension of about 445 g of calcium hydroxide in 1000 ml of water. Stirring is continued for one hour under boiling temperature, the calcium sulfate precipitated is suction-filtered at 90° C and washed with 2500 ml of water. The combined filtrates are concentrated to a volume of about 1500 ml and then mixed at 50° C within 1 hour with 180 g of ammonium hydrogen carbonate. Stirring is continued for 1 hour at 80° C, the calcium carbonate precipitated is filtered. The filtrate is evaporated until dry at 90° – 100° C. 355 g of the corresponding dyestuff sulfonated with 4 to 5 sulfo groups per molecule in the form of the ammonium salt are obtained which are very suitable for the preparation of violet aqueous writing tints.

The dyestuff is furthermore suitable for the dyeing of wool and synthetic polyamide from an acidifed aqueous dyebath.

EXAMPLE 13

2.8 g of a 10% solution of the dyestuff prepared according to Example 9, in dimethyl-formamide are introduced into 100 g of a 28% solution of an acidically modified polyacrylonitrile in dimethylformamide while stirring, and distributed homogeneously. The spinning solution thus obtained is spun according to a technically usual process (dry or wet spinning process). The dyed fibre obtained shows a bluish violet shade with a very high color intensity and is characterized by very good fastness properties, especially very good fastness to wetting, rubbing, light and sublimation.

According to the process of the invention, as for example in accordance with the process described in Example 1, further violet dyestuffs may be obtained when using the amines described below:

| Ex. | m- or p-substituted amine | o-substituted amine |
|---|---|---|
| 14 | 4-butylaniline | 2-methylaniline |
| 15 | 4-isopropylaniline | 2-methylaniline |
| 16 | 3-methoxyaniline | 2-methylaniline |
| 17 | 3-bromoaniline | 2-methylaniline |
| 18 | 3-fluoroaniline | 2-methylaniline |
| 19 | 4-methoxyaniline | 2-methylaniline |
| 20 | 4-aminobiphenyl | 2-methylaniline |
| 21 | 4-amino-naphthylphenyl | 2-methylaniline |
| 22 | 4-methylsulfonylaniline | 2-methylaniline |
| 23 | 4-methoxycarbonylaniline | 2-methylaniline |
| 24 | 3,4-dimethylaniline | 2-bromoaniline |
| 25 | 3,4-dimethylaniline | 2-butylaniline |

-continued

| Ex. | m- or p-substituted amine | o-substituted amine |
|---|---|---|
| 26 | 3-methylaniline | 1-amino-2-methylnaphthalene |
| 27 | 3-methylaniline | 1-amino-2-chloronaphthalene |
| 28 | 3-methylaniline | 2-methyl-4-chloroaniline |
| 29 | 3-methylaniline | 2-methyl-4-fluoroaniline |
| 30 | 3-methylaniline | 2-methyl-4-bromoaniline |
| 31 | 3-methylaniline | 2,4-dimethylaniline |
| 32 | 3-methylaniline | 2,4,5-trimethylaniline |
| 33 | 3-methylaniline | 2-chloro-4-methoxyaniline |
| 34 | 3-methylaniline | 2-chloro-4-butoxyaniline |
| 35 | 3-methylaniline | 2-chloro-4-ethylaniline |

We claim:

1. In a process for preparing a triphenylmethane dyestuff wherein one mol of an aluminum chloride, borotrifluoride or iron-III-chloride complex compound of a 4,4′,4″-trihalogenotriphenylmethyl-halide is reacted with 1 to 1.5 mols of a phenyl- or naphthyl amine substituted in m- or p-position by halogen, alkyl of 1 to 4 carbon atoms, alkoxy of 1 to 4 carbon atoms, phenyl, naphthyl, nitro, cyano, sulfonamide, a sulfonic acid (lower alkyl) ester or a carboxylic acid (lower alkyl) ester group, at a temperature of from about 110° to about 135° C, in the presence of an organic solvent which is inert under the reaction conditions, and the 4,4′-dihalogeno-4″-(m- or p-substituted)-phenylamino-(or naphthylamino)-triphenylmethyl halide formed is reacted with an arylamine, the improvement for preparing a violet dyestuff consisting of reacting said 4,4′-dihalogeno-4″-(m- or p-substituted)-phenylamino- or naphthylamino-triphenylmethylhalide formed with 5 to 20 mols of an ortho-substituted phenyl or naphthyl amine at a temperature between 150° and 190° C.

2. A process as claimed in claim 1, which comprises using in the first reaction step 1 to 1.5 moles of an aniline substituted in m-position by chlorine, methyl, ethyl, methoxy or ethoxy, and in the second reaction step 5 to 20 mols of an aniline substituted in o-position by chlorine, methyl or ethyl.

3. A process as claimed in claim 1 which comprises using in the first reaction step m-toluidine and in the second reaction step o-toluidine.

4. A process as claimed and in claim 1, which comprises carrying out the reaction with the ortho-substituted phenyl- or naphthyl amine at a temperature between 170° and 180° C.

5. The dyestuffs prepared according to a process as claimed in claim 1.

* * * * *